J. BOYD.
AUTOMATIC WINDMILL OILER.
APPLICATION FILED MAY 14, 1912.

1,058,216.

Patented Apr. 8, 1913.

Witnesses
M. A. Bond.
M. Willis

Inventor
John Boyd.
By E. H. Bond
Attorney

UNITED STATES PATENT OFFICE.

JOHN BOYD, OF BRENTWOOD, CALIFORNIA.

AUTOMATIC WINDMILL-OILER.

1,058,216. Specification of Letters Patent. Patented Apr. 8, 1913.

Application filed May 14, 1912. Serial No. 697,312.

*To all whom it may concern:*

Be it known that I, JOHN BOYD, a citizen of the Dominion of Canada and subject of the King of Great Britain, and resident of Brentwood, in the county of Contra Costa, State of California, United States of America, have invented certain new and useful Improvements in Automatic Windmill-Oilers, of which the following is a specification.

This invention relates to certain new and useful improvements in automatic windmill oilers and it has for its objects among others to provide an improved and simplified form of automatic oiling device embodying no complicated mechanism, no pumping for oil pressure and one in which the parts are all duplicable, thus insuring ease of repair when necessary.

The device in addition to embodying absolute simplicity, is inexpensive of manufacture comparatively and insures perfect regulation of the oil flow and operable either by the vane or from the ground.

Other objects and advantages of the invention will hereinafter appear and the novel features thereof will be particularly pointed out in the appended claims.

The invention, in its preferred form, is clearly illustrated in the accompanying drawings, which, with the numerals of reference marked thereon, form a part of this specification, and in which—

Figure 1:
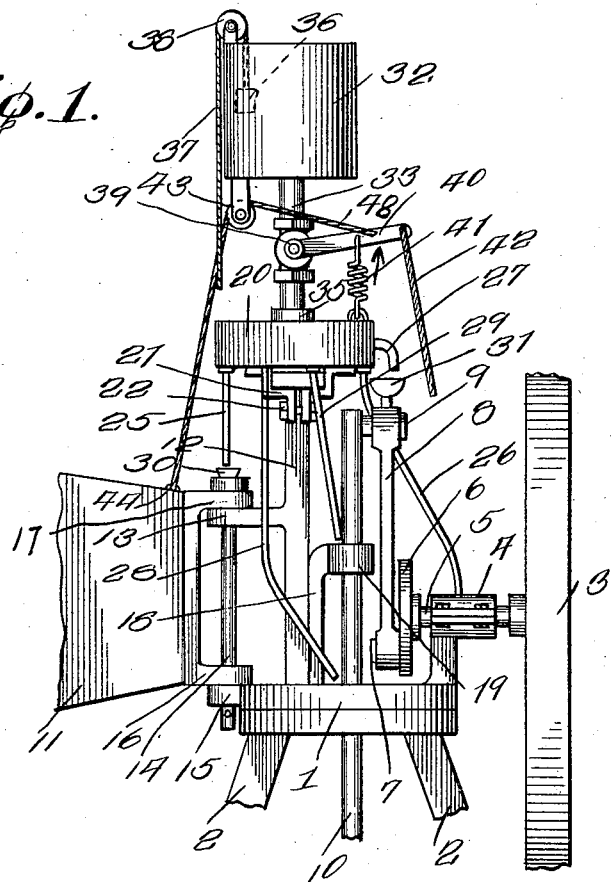
Figure 2:
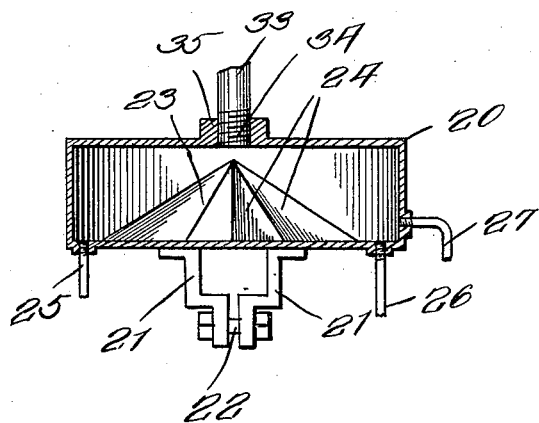

Figure 1 is a side elevation showing the application of my invention. Fig. 2 is an enlarged substantially central vertical section through the distributing chamber.

Like numerals of reference indicate like parts throughout the several views.

In the present instance I have shown my improvements applied to one form of windmill, but it will at once be evident that the improvement is applicable to other forms of windmill, that shown being chosen merely for the purpose of illustrating the manner in which the invention is applied for use. As the parts of the windmill form no part of the present invention and may be of any of the well-known or preferred forms of construction, a detail description thereof is deemed unnecessary. Suffice it to say that 1 designates the turn table, 2, 2 members of the support therefor, 3 the wheel, 4 a suitable bearing for the shaft 5, 6 the crank disk carrying the crank pin 7 to which the crank 8 is attached, the other end, in turn, being connected to the crank 9 of the plunger rod 10.

11 is the tail vane and 12 a standard having the lateral member 13 in which is mounted one end of the rod 14, the other end of which has a bearing on the lug 15 on the turn table and on this rod the lugs 16 and 17 of the tail vane are mounted.

18 is a standard having a bearing 19 for the plunger rod, all as seen in Fig. 1.

My invention is applicable to the windmill above the shaft bearings and adapted for supplying an oil or lubricant to all of such bearings.

My improved construction embodies a distributing chamber 20 provided upon the under side with clamps 21 which are designed to be secured to the head or standard 12 of the mill by bolts or the like 22. Within this chamber is a preferably solid cast convex or conical rose or distributer 23 which may be provided with the inclined channels 24 for the purpose of conducting the oil or lubricant to the various tubes leading from the bottom of said chamber. These tubes, such as 25, 26, 27, 28 and 29, may be arranged in any suitable manner and disposed so as to discharge the oil to the part to be lubricated. As seen in Fig. 1, the tube 25 is arranged to discharge the oil to the bearing for the shaft of the tail vane, a suitable cup 30 being provided, if desired, for this purpose. The tube 26 leads to the bearing of the shaft 5; the tube 27 is shown as arranged to discharge into a cup 31 for the purpose of lubricating the bearing of the crank 9; the tube 28 is shown as arranged to discharge the oil at a proper point to lubricate the bearing of the turn table, while the tube 29 is shown as arranged to discharge the oil where it will automatically lubricate the bearing of the plunger rod 10 in the lug 19. It is evident that other tubes may be employed, if desired, and that these tubes may be of any suitable material, more or less flexible, if desired, in order that their position may be changed when occasion may require.

Oil is supplied to the chamber 20 in the following manner: 32 is an oil reservoir supported above the chamber and having a discharge pipe 33, the lower end of which is preferably screwed, as at 34, into a screw-threaded lug 35 on the upper end of the said chamber 20, as seen best in Fig. 2. Any suitable gage or means may be employed, for indicating the quantity of oil in the reservoir 32. In the present instance I have shown a common and well-known device for this purpose embodying a float 36 carried by a chain or cord 37 passing over a roller 38 mounted on the upper end of the reservoir 32 and provided with any suitable means for readily showing the depth or height of the oil in the reservoir. In the pipe 33 is a valve 39 of any suitable form, in this instance shown as a rotary valve and connected with the stem thereof is a lever 40, 41 being a spring connected at one end with said lever between its ends and the other end of the spring being connected in any suitable manner to the chamber 20, whereby the valve or stop cock 39 is automatically regulated. 42 is a cord or wire connected with the free end of the lever 40 and extended to the ground where it may be attached to a hook on the frame to be operated by hand. It is arranged to be operated from the ground so as to facilitate the shutting off of both the mill and oil in case of a gale or storm. The lever 40 has connected thereto at one end a cord 48, the other end of which, after passing over a pulley 43, which may be located at any suitable point, supported from the reservoir 32, the distributing chamber 20, or any other fixed part, is attached to the tail of the windmill at the upper inside corner thereof, as shown at 44. When the wind is blowing and the mill is on, the vane is at right angles to the wheel, when the mill is off it lies flat and parallel with the wheel. Pulling the cord in the act of setting the mill turns the vane to an angle of 90 degrees and pulls the valve open full; at one-quarter circle, it would be practically closed; when open it allows of the flow of the oil downward to the distributing chamber. The outlets from the distributing chamber are so sized in accordance with the size of the windmill that no more oil flows therefrom than the windmill requires for its operation. The spring acts merely to force the valve back to its closed position, acting downwardly; when the vane is moved, the valve (which is an ordinary rotary valve) is opened, against the action of the spring, the movement of the vane causing an upward pull on the cord 48. By this means, the oil supply is automatically regulated and the feed is drop by drop, or greater, according to the opening of the mill.

From the foregoing, it will be seen that I have devised a very simple and efficient, yet durable and reliable form of automatic windmill oiler, and while the structural embodiment of the invention as hereinbefore disclosed is what I at the present time consider preferable, it is evident that the same is subject to changes, variations and modifications in details, proportion of parts etc. without departing from the spirit of the invention or sacrificing any of its advantages. I, therefore, do not wish to restrict myself to the exact construction, details etc. as hereinbefore set forth, but reserve the right to make such changes, variations and modifications as come properly within the scope of the protection prayed.

What is claimed as new is:—

1. In an automatic windmill oiler, a distributing chamber, pipes leading therefrom, a supply pipe leading thereto, a distributing member within said chamber, a reservoir, a rotary valve on a horizontal axis interposed between said reservoir and chamber, a lever connected with the stem of the valve, a spring connecting said lever and the said chamber, a tail vane and a cord connecting said tail vane and lever.

2. In an automatic windmill oiler, a distributing chamber, pipes leading therefrom, a supply pipe leading thereto, a distributing member within said chamber, a reservoir, a rotary valve on a horizontal axis interposed between said reservoir and chamber, a lever connected with the stem of the valve, a spring connecting said lever and the said chamber, a tail vane, a cord connecting said tail vane and lever, and a cord connected with the free end of the lever for actuating the latter against the tension of the spring.

3. In an automatic windmill oiler, a distributing chamber, means thereon for attaching the same to the head of a mill, a reservoir, a pipe connecting the same with said chamber, a valve rotatable on the horizontal axis in said pipe, a spring-controlled lever connected with said valve, and ligaments connected with said lever and constructed to be actuated by the vane and from the ground.

Signed by me at Oakland, California this 20th day of April 1912.

JOHN BOYD.

Witnesses:
ROBT. L. MCKEE,
Z. W. MITCHELL.

---

Copies of this patent may be obtained for five cents each, by addressing the "Commissioner of Patents, Washington, D. C."